United States Patent [19]
Weissman

[11] 3,875,665
[45] Apr. 8, 1975

[54] DUAL PIN FOR PROSTHODONTIC CASTS

[76] Inventor: Bernard Weissman, 225 E. 48th St., New York, N.Y.

[22] Filed: Dec. 19, 1973

[21] Appl. No.: 426,183

[52] U.S. Cl. ................................................. 32/11
[51] Int. Cl. ......................................... A61c 13/10
[58] Field of Search ...................... 32/40 R, 11, 71

[56] References Cited
UNITED STATES PATENTS
1,711,947   5/1929   Ingwersen ............................. 32/71

Primary Examiner—Robert Peshock
Attorney, Agent, or Firm—Friedman & Goodman

[57] ABSTRACT

A device is described suitable for use with dental models which includes a tapered elongate pin having a generally elliptical transverse cross section. A mounting post is connected to the wide end of the elongate pin, the post and the pin generally extending in parallel opposing directions. A key projects radially from the region of the mounting post. A stabilizing platform is connected to the elongate pin in the region of the connection point between the latter and the mounting post. The platform extends in a direction substantially normal to the respective axis of the elongate pin and mounting post. An alignment pin is provided mounted on the platform spaced from and extending in a coextensive direction parallel to the elongate pin. The mounting post and key are adapted to be embedded in a respective hole and keyway of a dental model cast and fixed to the latter by adhesive means or the like to fix the position of the device relative thereto. On the other hand, the elongate pin, the stabilizing platform and the alignment pin extend beyond the surface of the dental model cast and are receivable in corresponding apertures or recesses of a base cast on which the dental model cast is to be removably mounted.

12 Claims, 14 Drawing Figures

DUAL PIN FOR PROSTHODONTIC CASTS

BACKGROUND OF THE INVENTION

The present invention generally relates to prosthodontic casts, and more particularly to an improvement in pins which permit separation and simple replacement in original positions of segments of a dental cast or model on a base cast.

In prosthodontic dentistry, it is well known procedure to form an impression of a portion of a dentition of interest and reproduce the same in the form of a dental model made from artificial stone or the like. The dental model, which normally represents two or more adjacent teeth, can thereby be closely examined. To facilitate work on one or more teeth which need correction, or to facilitate the formation of a prosthesis, the dental model or cast is advantageously cut into segments so that each segment embodies the representation of only one or two teeth. The cutting of the dental cast in this manner, however, represents a problem since this disturbs the initial fixed positions of teeth on different segments relative to each other. Various means have been proposed to alleviate and, in fact, eliminate this problem. For example, pin systems are known which are embedded in the segments of interest prior to being severed or cut from each other. Typically, a plurality of pins are embedded in each of the segments, with the projecting ends of these pins being receivable in a base cast. The base cast is normally formed by pouring a hardenable material on the dental model cast with the pins mounted or embedded in the latter. Accordingly, holes are formed in the base cast which serve as permanent reference points or locations into which the pins can subsequently be inserted to restore the relative positions of the segments to one another after the dental cast is cut into the segments.

However, many of the prior art pin systems have had the disadvantage that they require more than one pin to achieve the necessary locating and alignment functions to properly position the segments relative to the base cast. The handling of the larger number of pins has made the process inconvenient and time consuming. Additionally, many of the prior art pin systems utilize sleeves which are embedded in the base cast. These sleeves are normally mounted on the projecting ends of the pins before the base cast is poured. As is evident, the use of the prior art pin has generally been complicated by the large number of elements or components which have been required.

SUMMARY OF THE INVENTION

Accordingly, it is an object of the present invention to provide a pin arrangement for prosthodontic casts which does not have the disadvantages above described in connection with comparable prior art pin arrangements.

It is still another object of the present invention to provide a prosthodontic cast pin arrangement which is simple in construction and economical to manufacture.

It is still another object of the present invention to provide a dual pin for prosthodontic casts which is in the form of a single unit and which includes a support post projecting in one direction adapted to be embedded in a dental cast or model, and two spaced pins directed in an opposite direction, one of the pins being longer and adapted to locate a corresponding hole in a base cast and a shorter pin adapted to align the dual pin in the desired angular orientation when received in a corresponding hole in the base cast.

It is yet another object of the present invention to provide a pin of the type suggested in the last object which includes a key projecting radially from the support post adapted to be embedded in a keyway in the dental model cast to prevent rotation of the dual pin about the support post.

It is a further object of the present invention to provide a dual pin as above suggested which includes a longer locating pin which has a generally elliptical transverse cross section and which is tapered to exhibit smaller dimensions in the direction away from the support post, whereby the longer pin is particularly adapted to locate a corresponding opening in a base cast without the need to utilize sleeves of any type. The longer locating pin also locks the dual pin when fully received within the corresponding opening due to its generally flattened shape and resists rotation of the device.

It is a further object of the present invention to provide a dual pin of a type generally under discussion which requires but a single hole to be drilled in the dental cast or model for each portion thereof which is to be made into a separable segment, as opposed to at least two holes typically required in other prior art pin arrangements.

It is yet a further object of the present invention to provide a dual pin in the form of a single unit which provides the desired locating and stabilizing features of prior art arrangements which utilize at least two pins while being in the form of a simple and economical device which is easy and convenient to use.

To achieve the above objects, as well as others which will become apparent hereafter, a device in accordance with the present invention for use with a dental model comprises a tapered elongate pin having a generally elliptical transverse cross section. The term elliptical transverse cross section as used in the present description and claims is not intended to be limiting but only exemplary. Any flattened pin or noncircular pin can be utilized for this purpose. A mounting post is provided which is connected to the wider end of said elongate pin. Said post and said pin generally extend in opposing parallel directions. Said mounting post is adapted to be embedded in a dental model cast to fix the position of the device relative thereto. Said elongate pin extends beyond the dental model cast and is receivable in a corresponding aperture of a base cast on which the dental model cast is to be removably mounted.

According to a presently preferred embodiment, an annular enlarged portion is provided which surrounds said mounting post proximate to said elongate pin. Said annular enlarged portion is adapted to be disposed within a counterbore hole formed in said dental model cast. A key is provided which projects radially from the region of said mounting post, said key being adapted to be received within a keyway formed in the dental model cast. With such an arrangement, the mounting post and the key together fix the position of the device relative to the dental cast when said mounting post and key are connected or fixed to the dental cast by means of adhesive means or the like.

Advantageously, a stabilizing platform is provided which is connected to said elongate pin in the region of the connecting point between the latter and said mounting post. Said platform extends in a direction substantially normal to the respective axis of said elongate pin and mounting post. An alignment pin is provided which is mounted on said platform spaced from and extending coextensively in a direction parallel to said elongate pin. Said platform and alignment pin are adapted to be received in complementary recesses in the base cast when the dental model cast is positioned on the latter.

The single dual pin of the present invention requires but a single hole to be drilled in each portion of the dental cast which is to be formed into a separable segment. The key and adhesive means together fix the dual pin to the dental cast. The elongate tapered pin serves as a locating pin while the latter and alignment pin are utilized to fix the angular orientation of the dual pin when the dental model segment is disposed in the desired or original position.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a front elevational view of a dual pin in accordance with the present invention;

FIG. 2 is a side elevational view of the dual pin shown in FIG. 1;

FIG. 3 is a top plan view of the dual pin shown in FIGS. 1 and 2;

FIG. 4 is a bottom plan view of the dual pin shown in FIGS. 1 and 2;

FIG. 5 is a perspective view of a dental model cast formed from an impression of a patient's teeth, showing in dashed outlines the cutting lines at which points a particular segment of interest is to be severed from the rest of the cast;

FIG. 6 is a cross section of the dental model shown in FIG. 5, showing the manner in which a hole and countersink are drilled in a flat surface of the dental model or cast;

FIG. 7 is a bottom plan view of the flat surface of the dental cast shown in FIG. 6, further showing a slot or keyway disposed radially from the counterbore hole;

FIG. 8 is similar to FIG. 6, but inverted and shown with a dual pin of the type shown in FIGS. 1–4 mounted and fixed on the dental model by having a portion thereof received within the holes formed through the flat surface of the cast;

FIG. 9 is similar to FIG. 8, but showing the manner in which a base cast is formed to cooperate with the dental cast, showing a dam or containing wall disposed about the flat surface and a hardenable material poured therein to surround and embed the portions of the dual pin which project above the dental model or cast;

FIG. 10 is similar to FIG. 9, but shown when the hardenable material has hardened into a base cast and shown with the dental cast separated from the latter by withdrawal of the pins from the base cast;

FIG. 11 is a top plan view of the base cast shown in FIG. 10; and

FIGS. 12, 13 and 14, are similar to respective FIGS. 2, 3 and 7, but showing an embodiment having two keys or keyways instead of one.

DESCRIPTION OF THE PREFFERED EMBODIMENTS

Referring now to the drawings, wherein identical or similar parts are designated by the same reference numerals throughout, and first referring to FIGS. 1–4, a dual pin 10 is shown in its various views. As will become clear from the description that follows, the dual pin 10 replaces the plurality of pins heretofore used in the prior art, without sacrifice in performance. In fact, as will become evident, the procedure for utilizing the dual pin 10 is substantially made easier and more convenient.

The dual pin 10 includes an elongate tapered pin 12 which shall also be designated as a locating pin. The locating or tapered pin 12 has opposing ends 14 and 16, the cross sectional area continuously decreasing from the end 14 towards the end 16.

In addition to being tapered, the pin 12 is also flattened to include a front profile 18, shown in FIG. 1, which is dimensionally smaller than a side profile 20, shown in FIG. 2. In this sense, the tapered pin has a generally elliptical transverse cross section, as best depicted in FIG. 4. However, the term elliptical in this present application and claims is not to be limited to the literal meaning of the term, but is intended to include all other flattened, non-circular cross sections. Accordingly, rectangular or wedge-shaped cross sections can similarly be used, with varying degrees of advantage. The purpose of imparting such a flattened configuration to the elongate locating pin 12 will be described hereafter.

A stabilizing platform 21 is provided at the end 14 of the locating pin 12, the platform extending in a direction generally transverse to the axis or length of the locating pin. A shorter alignment pin 22 projects from the platform 21 in a direction substantially parallel to the axis or length of the pin 12 and in the direction of the end 16 of the latter pin. The alignment pin 22 is advantageously provided with a chamfer 24 and is spaced from the locating pin 12 to result in a space 25 therebetween. While the pin 22 is shown to be shorter than the locating pin 12, the specific ratio or relationship in the lengths shown in the drawings is not critical and the pin 22 may be made shorter or longer with respect to the pin 12. It is only important that the locating pin 12 remains longer than the alignment pin 22. The reason for this will be apparent hereafter from the description of FIG. 10.

While the alignment pin 22 is connected to the end 14 of the locating pin 12 and projects in a direction towards the end 16 of the latter, a further pin 26 is similarly connected to the end 14 of the locating pin but projects in an opposing direction. The pin 26 is in the form of a mounting post to be used in a manner to be described. Advantageously, the mounting post 26 is provided with a chamfer 28 at the free end thereof.

In the presently preferred embodiment, an annular enlarged portion 30 is provided which surrounds the mounting post 26 proximate to the end 14 of the elongate locating pin 12. An important feature of the present invention is the provision of a key 32 which projects radially from the region of the mounting post 26 and which is substantially coextensive in height with the annular enlarged portion 30.

Accordingly, the present invention is for a dual pin 10 for prosthodontic casts, the dual pin being formed as a single unit. The absolute dimensions of the dual pin 10 are not critical, and any suitable dimensions for this pin may be selected which are suitable for a particular application. The same configurated pin may, for example, be made in different sizes to accommodate different sized segments to which the pins are to be fixed. It is also noted that the pins can be made from any suitable material, including metal as well as elastomeric plastic. Any suitable manufacturing process, including molding and casting, may be used to form the dual pin. A presently preferred material for the dual pin 10 is cast metal.

The manner of utilizing the dual pin 10 will now be described in connection with FIGS. 5–11. Referring to FIG. 5, a positive cast or dental model 34 is shown to comprise a plurality of tooth models 36 mounted on a model of the gum 37. The dental model 34 may be made from any material commonly used for this purpose, such as plaster. Also shown in FIG. 5, in dashed outline, are cutting lines 38 or points at which the dental model 34 is to be cut by conventional means to form a plurality of segments 40 which are to be individually removable or separable from the rest of the cast.

A first step in preparing the prosthodontic cast 34 is to provide a substantially flat, smooth surface 42 on the surface of the cast 34 opposite to where the tooth models 36 are disposed. Once a flat surface 42 has been formed, the dental model 34 can be placed on a table or work surface of a drill press. A drill press particularly suitable for this purpose is described in my co-pending application entitled "Drilling Machines for Plaster Casts or Models," Ser. No. 320,275. The flat surface 42 is now provided with a hole 44 and a counterbore hole 46 with a suitable drill bit 47. Referring to FIG. 7, a slot, recess of keyway 48 is subsequently formed which extends radially from the counterbore hole 42. The keyway 48 can be formed by means of a circular saw. However, it should be clear that the specific method of forming the holes 44 and 46 as well as the method of forming the keyway 48 is not critical and any method of so forming these recesses or apertures may be used, with varying degrees of advantage.

The diameter of the hole 44 is selected to receive the mounting post 26 while the diameter of the counterbore hole 46 is dimensioned to receive the annular enlarged portion 30 of the dual pin 10. For the same reason, the dimension of the width of the keyway 48 is selected to receive the key 32 when the mounting post and annular enlarged portion 30 are respectively received in the holes 44 and 46. The dimensions of the holes and keyway formed in the flat surface 42 are selected to receive the aforementioned portions of the dual pin 10 with some clearance so that the dual pin can be disposed within the holes and keyway as shown in FIG. 8 without damage to the dental cast 34. To permanently fix the dual pin 10 to the dental cast 34, adhesive 50 is advantageously provided at the mating surfaces between the pin 10 and the dental cast. With such an arrangement, it should be clear that the dual pin 10 is prevented from separating from the dental cast 34. Additionally, the insertion of the key 32 within the keyway 48 lends additional support or rigidity against angular rotation of the pin about the axis of the mounting post 26.

It will be noted from FIG. 8 that the locating pin 12, the platform 21 as well as the alignment pin 22 project above the flat surface 42 while the mounting post 26, the annular enlarged portion 30 and the key 32 become embedded within the dental cast 34.

While the key 32 is an advantageous and important feature of the present invention, the dual pin 10 can be utilized in a substantially similar manner when the key 32 is omitted. In the latter case, it should be clear that the steps involved in mounting the dual pin 10 within the dental cast 34 merely involves the single operation of drilling the hole 34 and countersink 46. This at least halves the number of operations required in the prior art pin arrangements.

Once the dual pin 10 is mounted on the dental cast 34 as shown in FIG. 8, a wax sheet or dam 52 may be disposed about the periphery of the dental cast 34 as suggested in FIG. 9. A hardenable material such as plaster may then be poured interiorly of the dam 52 to form a plaster base 54 upon hardening. While the plaster, or other comparable material, is in a soft state, it is clear that this material will fully surround the locating pin 12, the platform 21 and the alignment pin 22 to embed the same.

Referring to FIGS. 9 and 10, when the plaster base 54 has hardened, an elongate tapered hole 56, a receiving hole 58 and a receiving space 60 will be formed when the dental cast 34 is separated from the base cast 54. The receiving hole 56 assumes a complementary configuration to that of the locating pin 12 while the receiving hole 58 has a complementary shape to that of the alignment pin 22. The space 60 assumes the general configuration of the stabilizing platform 21. A ridge 59 is formed in the base cast 54 which is receivable within the space 25 formed between the pins 22 and 12. A more detailed description of the general procedure or method of forming a base cast is described in my co-pending patent application entitled: "Pin Arrangement for Prosthodontic Casts," Ser. No. 386,722.

It should be clear, particularly from an examination of FIG. 10, that the dental cast segment 40 of the dental cast 34 can now be separated from the base cast 54. After the dental cast 34 has been examined or worked on, it can be replaced in the precise initial or original position with reference to the base cast 54, and consequently with reference to adjacent dental cast segments. When replacing the dental cast 34 segment onto the base cast 54, the longer tapered locating pin 12 is generally aligned with the corresponding receiving hole 56. It will be noted that in this initial alignment position, the narrowest end 16 is disposed adjacent to the widest part of the receiving hole 56, this facilitating initial location and insertion. Once the locating pin 12 has been at least partially received within the hole 56, the dental cast can be lowered towards the position shown in FIG. 9. Due to the oblong or non-circular cross section of the locating pin 12, and the resulting receiving hole 56, the dental cast segment is angularly aligned to automatically bring the alignment pin 22 into position for being received within the hole 58. Similarly, the platform 21 is brought to a position to be received within the space 60. The platform 21 and the alignment pin 22, in addition to the locating pin 12 itself, assist in stabilizing the dual pin 10 and prevent the latter from angularly turning initially or with repeated use.

According to a modification of the dual pin 10 described above, two radially directed keys 32 and 32' are diametrically disposed about the enlarged portion 30, as shown in FIGS. 12 and 13. Accordingly, two radially directed keyways 48 and 48' can be formed in the cast 34, diametrically disposed relative to the hole 44 and counterbore 46, as shown in FIG. 14, to receive the keys 32 and 32'. This modification further enhances the resistance of the dual pin 10' against rotation.

Numerous alterations of the structure herein disclosed will suggest themselves to those skilled in the art. However, it is to be understood that the present disclosure relates to a preferred embodiment which is for purpose of illustration only and is not to be construed as a limitation of the invention.

What is claimed is:

1. A device for use with dental models comprising a tapered elongate pin having a generally elliptical transverse cross section; a mounting post connected to the wider end of said elongate pin, said post and said pin generally extending in parallel opposing directions, said mounting post being adapted to be embedded in a dental model cast to fix the position of the device relative thereto; and an alignment pin spaced from and connected to the wider end of said elongate pin and extending in the same direction as said elongate pin and being parallel to the latter, said elongate and alignment pins extending beyond the dental model cast and being receivable in corresponding complementary apertures of a base cast on which the dental model cast is to be mounted.

2. A device as defined in claim 1, wherein said elongate pin and mounting post are made from a cast material.

3. A device as defined in claim 1, further comprising an annular enlarged portion surrounding said mounting post proximate said elongate pin, said annular enlarged portion being adapted to be disposed within a counterbore hole formed in the dental model cast.

4. A device as defined in claim 1, further comprising adhesive means interposed between said mounting post and a hole formed in the dental model cast, whereby the device is fixed to the dental model cast.

5. A device as defined in claim 1, further comprising a key projecting radially from the region of said mounting post, said key being adapted to be received within a keyway formed in the dental model cast, whereby the device is prevented from rotation when said mounting post and key are embedded in the dental model cast.

6. A device as defined in claim 1, wherein said elongate pin is substantially longer than said mounting post.

7. A device as defined in claim 1, wherein said elongate pin and mounting post are substantially aligned along the respective axis thereof.

8. A device as defined in claim 1, further comprising a stabilizing platform connected to said elongate pin in the region of the connection point between the latter and said mounting post, said platform extending in a direction substantially normal to the respective axis of said elongate pin and mounting post, said alignment pin being mounted on said platform spaced from and extending coextensively in a direction parallel to said elongate pin, said platform and alignment pin being adapted to be received in complementary recesses in the base cast when the dental model cast is positioned in the latter.

9. A device as defined in claim 8, wherein said elongate pin is substantially longer than said alignment pin.

10. In a dental model of teeth, wherein segments thereof may be individually removed and replaced in original positions, a first cast forming an impression of at least one tooth on one surface thereof and having a substantially flat surface in opposed relation to said one surface; a second cast provided with a substantially flat surface for abutting against said flat surface of said first cast; and a dual pin embedded in said first cast and comprising two spaced substantially parallel pins of different lengths connected to each other at corresponding ends thereof, said second cast being provided with openings in the flat surface thereof configurated to receive at least portions of said two spaced pins when said flat surfaces are in abutment against one another, whereby the longer pin serves as a locating pin which initially locates and engages a corresponding opening in said second cast and the shorter pin serves as an alignment pin which is received in a corresponding opening to align and fix the position of said first cast relative to said second cast.

11. A dental model as defined in claim 10, wherein said longer pin is tapered and has a generally elliptical transverse cross section.

12. A dental model as defined in claim 10, further comprising a mounting post directed in an opposing direction to that of said two spaced pins and adapted to be embedded in said first cast, and a key projecting radially from said mounting post and adapted to be embedded in said first cast to prevent rotational movement of said dual pin.

* * * * *